US008439285B2

(12) United States Patent
Beber et al.

(10) Patent No.: US 8,439,285 B2
(45) Date of Patent: May 14, 2013

(54) ADJUSTABLE FOOD PROCESSOR WITH GUIDE RAMP (75) Inventors: Kevin J. Beber, Granger, IN (US); Jeremy T. Wolters, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 507 days.

(21) Appl. No.: 12/769,796

(22) Filed: Apr. 29, 2010

(65) Prior Publication Data
US 2011/0265666 A1    Nov. 3, 2011

(51) Int. Cl.
B02C 17/02    (2006.01)
B02C 2/04    (2006.01)

(52) U.S. Cl.
USPC .............................................. 241/92; 241/286

(58) Field of Classification Search ............ 241/92, 241/286, 278.1, 277
See application file for complete search history.

(56) References Cited

U.S. PATENT DOCUMENTS

| | | | |
|---|---|---|---|
| 2,189,199 A | 2/1940 | Criner | |
| 3,199,860 A | 8/1965 | Moberg | |
| 3,623,525 A | 11/1971 | Kieves | |
| 4,190,208 A | 2/1980 | Schaeffer et al. | |
| 4,283,979 A * | 8/1981 | Rakocy et al. | 83/666 |
| 4,364,525 A | 12/1982 | McClean | |
| 4,560,111 A | 12/1985 | Cavalli | |
| 4,877,191 A * | 10/1989 | Golob et al. | 241/92 |
| 5,046,252 A | 9/1991 | Ayuta et al. | |
| 7,322,112 B2 | 1/2008 | Boerner | |
| 7,328,864 B2 * | 2/2008 | Narai et al. | 241/92 |
| 2006/0163396 A1 * | 7/2006 | Kennedy et al. | 241/92 |
| 2008/0156913 A1 | 7/2008 | Orent | |
| 2009/0314168 A1 | 12/2009 | Krasznai | |
| 2011/0139017 A1 * | 6/2011 | Beber et al. | 241/92 |

FOREIGN PATENT DOCUMENTS

| | | |
|---|---|---|
| DE | 3644267 A1 | 7/1988 |
| EP | 0100755 A2 | 2/1984 |
| FR | 2582497 | 12/1986 |
| FR | 2862199 A1 | 5/2005 |
| WO | 03057355 A1 | 7/2003 |
| WO | 2009/076585 A1 | 6/2009 |

OTHER PUBLICATIONS

Extended European Search Report. Application No. 11163931.6, filed Apr. 27, 2011, priority claim to U.S. Appl. No. 12/769,709.
Extended European Search Report. Application No. 11163932.4, filed Apr. 27, 2011, priority claim to U.S. Appl. No. 12/469,746.
Extended European Search Report, Application No. 11163933.2, filed Apr. 27, 2011, priority claim to U.S. Appl. No. 12/769,796.

* cited by examiner

Primary Examiner — Faye Francis (57) ABSTRACT

A food processor includes a bowl with a removable lid. Food items are advanced into the bowl through a feed tube formed in the lid where they are cut by a cutting blade. A rotating disk is adjustable relative to the blade assembly to vary the thickness of the food items cut by the blade assembly. A mounting arm is positioned below the cutting blade and has a ramp defined therein. The food processor includes an adjustment assembly operable to move the rotating disk relative to the cutting blade.

17 Claims, 6 Drawing Sheets

Fig. 6

ADJUSTABLE FOOD PROCESSOR WITH GUIDE RAMP

CROSS-REFERENCE TO RELATED U.S. PATENT APPLICATIONS

Cross-reference is made to co-pending U.S. Utility patent application Ser. No. 12/769,746 entitled "Food Processor With A Lockable Adjustable Blade Assembly," filed Apr. 29, 2010, and U.S. Utility patent application Ser. No. 12/769,709 entitled "Food Processor With Cutting Blade Assembly Support," filed Apr. 29, 2010, each of which is assigned to the same assignee as the present application, each of which is filed concurrently herewith, and each of which is hereby incorporated by reference.

TECHNICAL FIELD

The present disclosure relates generally to a domestic food processor, and more particularly to a food processor having a control for adjusting the cutting thickness of the food processor.

BACKGROUND

A food processor is a motorized domestic appliance for manipulating (e.g., chopping, slicing, dicing, shredding, grating, or blending) food items. Such an appliance includes a bowl with a removable lid. Food items are inserted into the bowl through a feed tube formed in the lid where they are cut by motor-driven cutting tool.

Food processors typically come equipped with a number of interchangeable cutting tools for slicing, shredding, or other food processing operations. One common cutting tool is a rotating disk-type cutter. Such a cutting tool includes a rotating disk having a cutting blade fixed thereto. The cutting blade is secured to the rotating disk at a location adjacent to an aperture formed in the disk so that pieces of food cut by the blade fall through the aperture and collect in the bottom of the bowl.

SUMMARY

According to one aspect of the disclosure, a food processing device is disclosed. The food processing device includes a base having a motor positioned therein, a removable bowl coupled to the base, and a removable lid coupled to the bowl so as to define a processing chamber. The lid has a feed tube that opens into the bowl. The food processing device also includes a blade assembly positioned in the processing chamber, which is driven by the motor and includes a cutting blade to cut food items advanced through the feed tube, and a rotating disk upwardly and downwardly moveable relative to the cutting blade to adjust the distance between an upper surface of the rotating disk and the cutting blade. The food processing device also includes an adjustment assembly operable to move the rotating disk relative to the cutting blade. The adjustment assembly includes a control knob coupled to the blade assembly and is positioned above the upper surface of the rotating disk, and a threaded sleeve coupled to the rotating disk and is positioned in the control knob.

In some embodiments, the rotating disk may divide the processing chamber into an upper compartment and a lower compartment, and the blade assembly may include a mounting arm having a ramp defined therein to guide food items from the upper compartment to the lower compartment. In some embodiments, the ramp may have an inclined surface extending outwardly in a radial direction from a first end to a second end.

The inclined surface may have a first angle of inclination at the first end and a second angle of inclination at the second end. In some embodiments, the first angle of inclination may be greater than or equal to the second angle of inclination. Additionally, in some embodiments, the first angle of inclination may be approximately 25 degrees. In some embodiments, the second angle of inclination may be approximately 15 degrees.

In some embodiments, the rotating disk may have a counterweight secured thereto, and the threaded sleeve may be positioned between the mounting arm and the counterweight. In some embodiments, rotation of the control knob in a first direction may cause upward movement of the rotating disk, and rotation of the control knob in a second direction may cause downward movement of the rotating disk.

In some embodiments, the blade assembly may include a central shaft coupled to the control knob, and the central shaft may be received in the threaded sleeve. Rotation of the control knob may cause the threaded sleeve to move upwardly and downwardly along the central shaft.

According to another aspect, a food slicer assembly for a food processor is disclosed. The food slicer assembly includes a cutting blade, a mounting arm, which has a ramp defined therein, that is positioned below the cutting blade, and a rotating disk moveable to a plurality of positions relative to the cutting blade to adjust the distance between its upper surface and the cutting blade. An adjustment assembly is operable to move the rotating disk relative to the cutting blade. The adjustment assembly includes an internally-threaded control knob positioned above the upper surface of the rotating disk, and an externally-threaded sleeve coupled to the rotating disk that is positioned in the control knob.

In some embodiments, the food slicer assembly may further include a central shaft that is coupled at an upper end to the control knob and is positioned in the sleeve. The mounting arm may extend outwardly from a first end secured to the central shaft to a second end positioned adjacent to an outer rim of the rotating disk. In some embodiments, the ramp may have an inclined surface extending in a radial direction from the first end of the mounting arm to the second end of the mounting arm. The inclined surface may have a first angle of inclination at the first end that is greater than or equal to a second angle of inclination at the second end. In some embodiments, the rotating disk may include a counterweight, and the sleeve may be positioned between the counterweight and the mounting arm.

According to another aspect, a food processor includes a base having a motor positioned therein, a removable bowl coupled to the base, and a removable lid coupled to the bowl so as to define a processing chamber. The lid has a feed tube that opens into the bowl. A cutting blade is positioned in the bowl and driven by the motor to cut food items advanced through the feed tube. A rotating disk is upwardly and downwardly moveable relative to the cutting blade to adjust the distance therebetween. The rotating disk divides the processing chamber into an upper compartment and a lower compartment. A ramp is positioned below the cutting blade to guide food items from the upper compartment into the lower compartment. The food processor further includes an adjustment assembly operable to move the rotating disk relative to the cutting blade. The adjustment assembly includes a user-operated control device positioned above the rotating disk.

In some embodiments, the adjustment assembly may include an externally-threaded sleeve coupled to the rotating disk, and the user-operated control device may include an internally-threaded control knob having a grip.

BRIEF DESCRIPTION OF THE DRAWINGS

The detailed description particularly refers to the following figures, in which.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Figure 1:
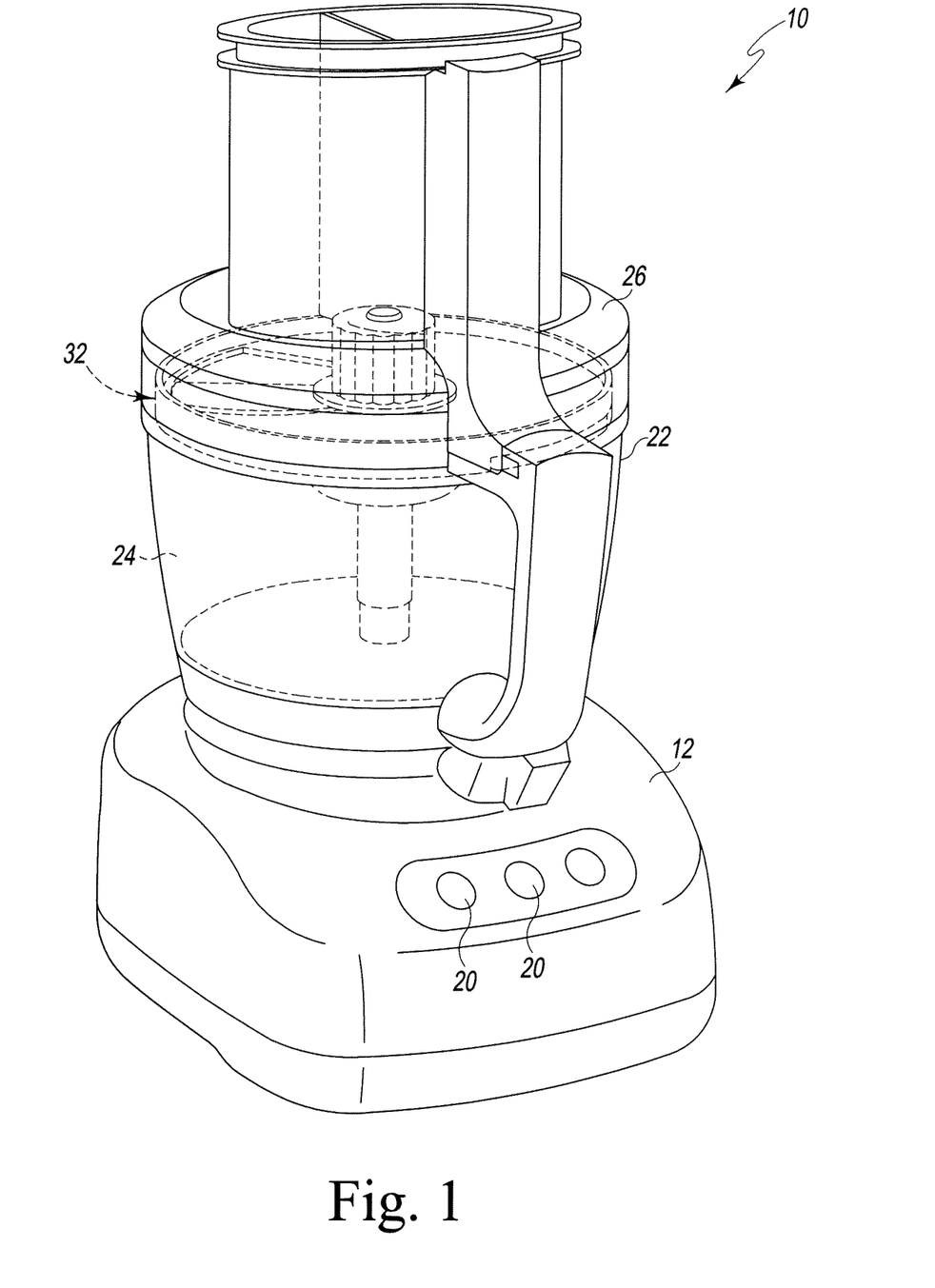
FIG. 1 is a perspective view of a food processor.

Referring to FIG. 1, a food processing device or food processor 10 is shown. One example of a food processor is the KitchenAid® 12-Cup Ultra Wide Mouth™ Food Processor, Base Model No. KFPW760OB, which is commercially available from Whirlpool Corporation of Benton Harbor, Mich., U.S.A. The food processor 10 has a base 12 that houses a motor 14 (shown schematically in FIG. 2) and a control unit (not shown). Under the control of the control unit, the motor's output shaft 16 drives a cutting blade 18 (see FIG. 2) to cut food items such as cheeses, meats, fruits, and vegetables. The base 12 also includes one or more buttons, switches, dials, or other types of controls 20. A user operates the controls 20 to control the operation of the motor 14 and hence the food processor 10. For instance, one of the controls 20 may be operable to turn the motor 14 on and off, while another control 20 may change the motor's speed.

As will be understood by those skilled in the art, the control unit may comprise analog and/or digital circuitry to process electrical signals received from the motor 14 (or other components of the food processor 10) and provide electrical control signals to the motor or other components of the food processor 10. For example, the control unit may be embodied as a microcontroller that executes firmware routines to control the operation of the food processor 10.

A removable bowl 22 is secured to the base 12. The bowl's handle facilitates placement of the bowl 22 on the base 12. The bowl 22 includes a removable lid 26 secured to its upper peripheral edge. The lid 26 has a feed tube 28 formed thereon through which food items such as fruits and vegetables are inserted into the bowl 22 to be processed by the food processor 10. Collectively, the lid 26 and the bowl 22 define a processing chamber 24 where food items are processed by the cutting blade 18.

The bowl 22, lid 26, and feed tube 28 are generally made of a transparent or translucent plastic material, so that the contents of the food processor 10 can be viewed by a user without removing the lid 26 from the bowl 22. Moreover, one or more locking mechanisms may be used to lock the bowl to the base 12 and the lid 26 to the bowl 22.

Figure 2:
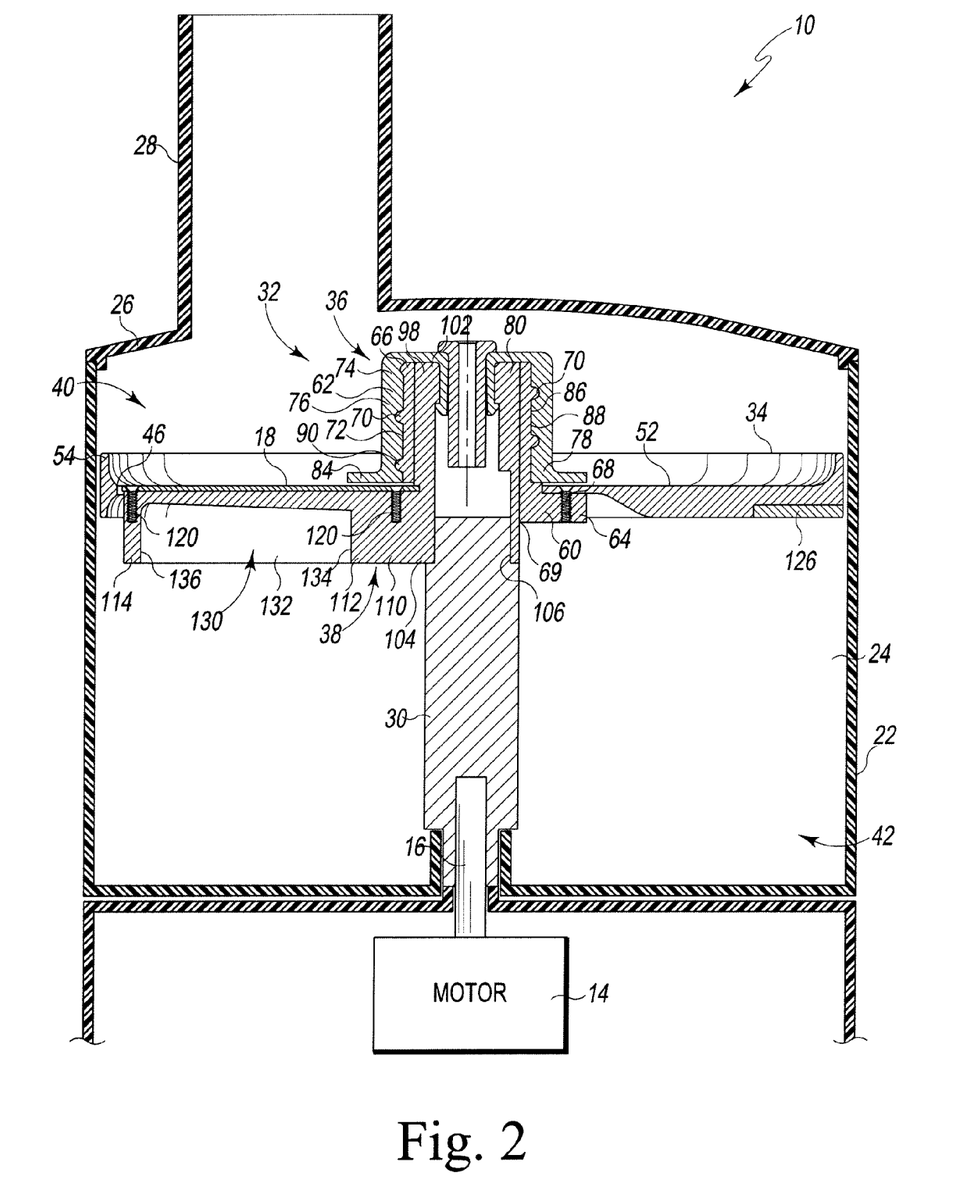
FIG. 2 is a partial cross-sectional view of the food processor of FIG. 1.
Figure 3:
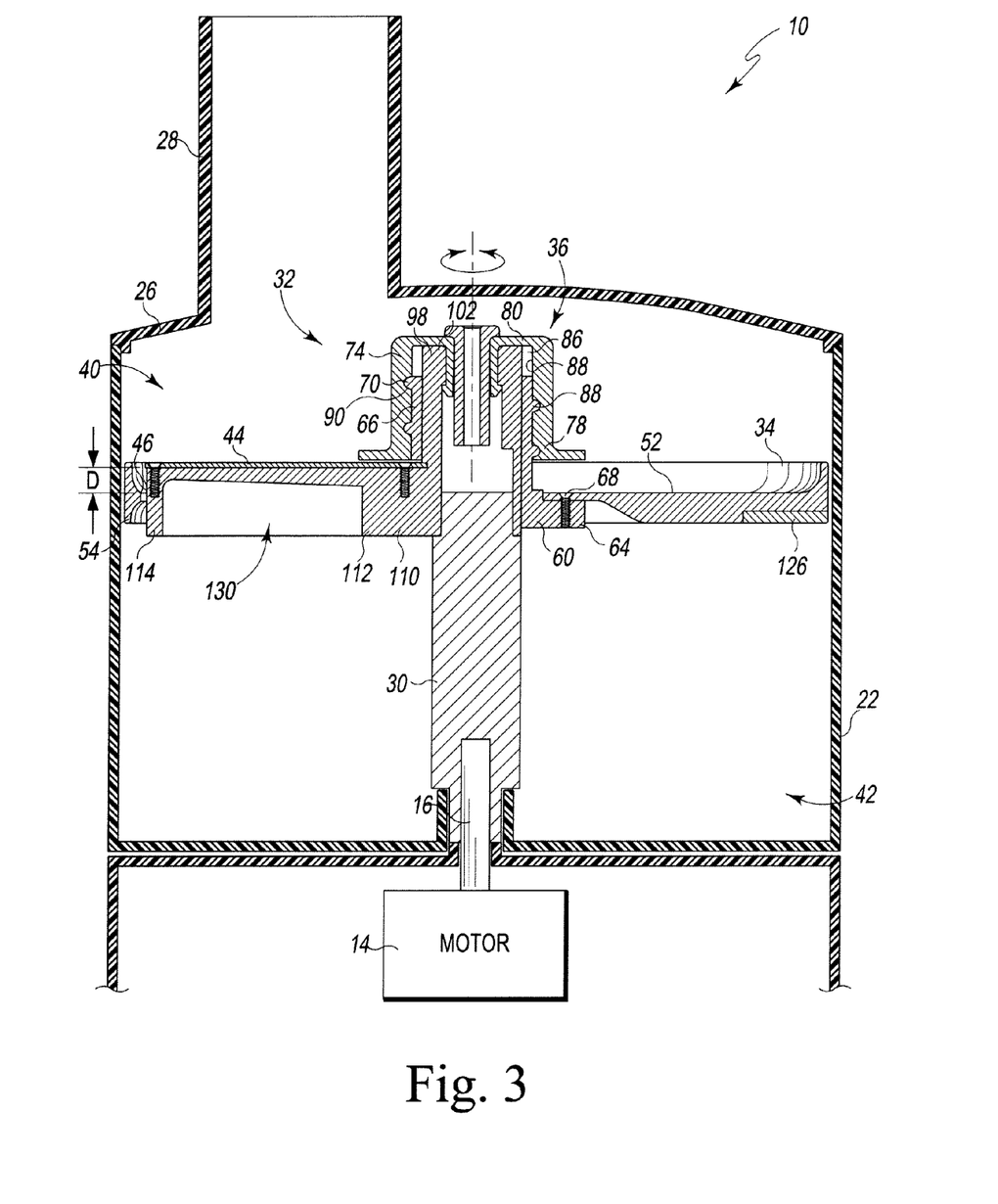
FIG. 3 is a view similar to FIG. 2, showing the rotating disk of the food slicer assembly in another position relative to the cutting blade.
Figure 4:
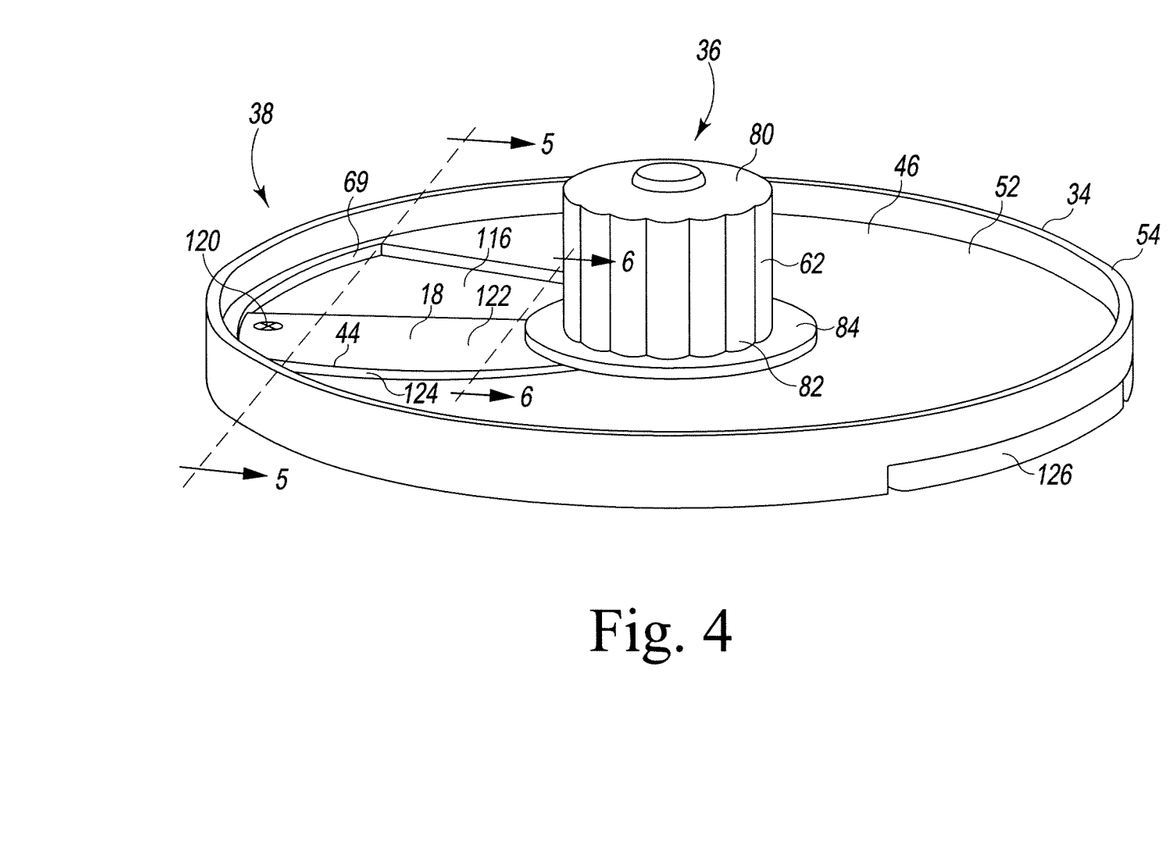
FIG. 4 is a perspective view of a food slicer assembly of the food processor of FIG. 1.

As shown in FIGS. 2 and 3, when the removable bowl 22 is secured to the base 12, the output shaft 16 of the motor 14 is coupled to a drive stem 30. The drive stem 30 is in turn coupled to a food slicer assembly 32. As shown in FIGS. 2-4, the food slicer assembly 32 includes a rotating disk 34, a thickness adjustment assembly 36, and a blade assembly 38, with the cutting blade 18 being one component thereof. The rotating disk 34 effectively divides the processing chamber 24 into an upper compartment 40 located between the disk 34 and the lid 26, and a lower compartment 42 located below the rotating disk 34. A vertical distance, D, between the cutting edge 44 of the cutting blade 18 and the upper surface 46 of the rotating disk 34 defines a cutting thickness. In other words, the thickness of the pieces of food items cut by the food processor 10 is determined by the distance D between the cutting edge 44 of the cutting blade 18 and the upper surface 46 of the rotating disk 34. When the distance D between the cutting edge 44 of the cutting blade 18 and the upper surface 46 of the rotating disk 34 is increased, thicker pieces of food items are created, with thinner pieces of food items being created when the distance D between the cutting edge 44 of the cutting blade 18 and the upper surface 46 of the rotating disk 34 is decreased.

The rotating disk 34 includes a planar body 52 and a rim 54 that extends upwardly from the outer perimeter of the planar body 52. The rotating disk 34 has a diameter that is slightly less than the inner diameter of the bowl 22 such that the rim 54 is positioned adjacent to, but spaced slightly apart from, the inner wall of the bowl to permit rotation of the disk 34 within the bowl 22. In the exemplary embodiment described herein, the rotating disk 34 is embodied as a monolithic structure (e.g., a single molded or cast part). However, it should be appreciated that the components of the rotating disk 34 (e.g., body 52 and rim 54) may be embodied as separate components secured to one another by an adhesive or other suitable fastener.

The thickness adjustment assembly 36 is operable by a user to vary the cutting thickness of the food processor 10 thereby creating thicker or thinner pieces of cut food items. The adjustment assembly 36 includes a hub 60 and a user-operated control device 62. The hub 60 includes a base 64 and a hollow sleeve 66 extending upwardly therefrom. A number of fasteners 68 (i.e., screws) extend through the planar body 52 into the base 64, thereby rigidly securing the rotating disk 34 to the hub 60. It will be appreciated that in other embodiments the hub 60 and the rotating disk 34 may be integrally formed as a monolithic structure. As shown in FIGS. 2 and 3, the sleeve 66 extends through an opening 69 formed in the planar body 52. External threads 70 are defined on a portion of an outer surface 72 of the sleeve 66.

The user-operated control device 62 is positioned above the upper surface 46 of the rotating disk 34. As shown in FIGS. 2-4, the user-operated control device 62 includes a control knob 74. The control knob 74 has a body 76 that extends from a lower end 78 to an upper end 80. The body 76 includes a knurled grip 82 formed in the upper end 80 and an annular flange 84 extending outwardly from the lower end 78. It should be appreciated that other user-activated control devices, such as levers, dials, buttons, or the like, may be substituted for the control knob.

As shown in FIGS. 2 and 3, the body 76 of the control knob 74 has an aperture 86 formed in the lower end 78 that receives the sleeve 66 of the hub 60. The inner surface 88 of the aperture 86 has internal threads 90 defined therein that correspond to the external threads 70 of the hub 60. The internal threads 90 of the control knob 74 threadingly engage the external threads 70 of the hub 60 to move the hub 60 (and hence the rotating disk 34) upwardly and downwardly relative to the cutting blade 18. For example, clockwise rotation of the control knob 74 causes upward movement of the hub 60 (and hence the rotating disk 34), while counter-clockwise rotation of the control knob 74 causes downward movement of the hub 60 (and hence the rotating disk 34).

As shown in FIGS. 2 and 3, a central shaft 98 of the blade assembly 38 is received in the hollow sleeve 66 of the adjustment assembly 36 and is secured at an upper end 102 to the control knob 74. The central shaft 98 extends from the upper end 102 to a lower end 104, which is has an opening 106 that receives the drive stem 30. In that way, the slicer assembly 32 is coupled to the output shaft 16 such that the slicer assembly 32 may be driven by the motor 14. The blade assembly 38 also includes a mounting arm 110 extending from an inner end 112, which is secured to the lower end 104 of the central shaft 98, to an outer end 114, which is positioned adjacent to the rim 54 of the rotating disk 34. In the illustrative embodiment, the central shaft 98 and mounting arm 110 are formed as a single monolithic component from a plastic or metallic material. It should be appreciated that in other embodiments the shaft 98 and arm 110 may be formed as separate components that are joined during final assembly by an adhesive or other suitable fastener.

The cutting blade 18 is secured to an upper surface 116 of the mounting arm 110. A number of fasteners 120 (i.e., screws) positioned at a rear edge 122 of the cutting blade 18 extend into the mounting arm 110, thereby rigidly securing the cutting blade 18 to the mounting arm 110. It will be appreciated that in other embodiments the fasteners 120 may take the form of T-stakes, pins, posts, or other structures capable of securing the cutting blade 18 to the mounting arm 110. Additionally, the mounting arm 110 may include an overmold that receives the cutting blade 18.

Figure 5:
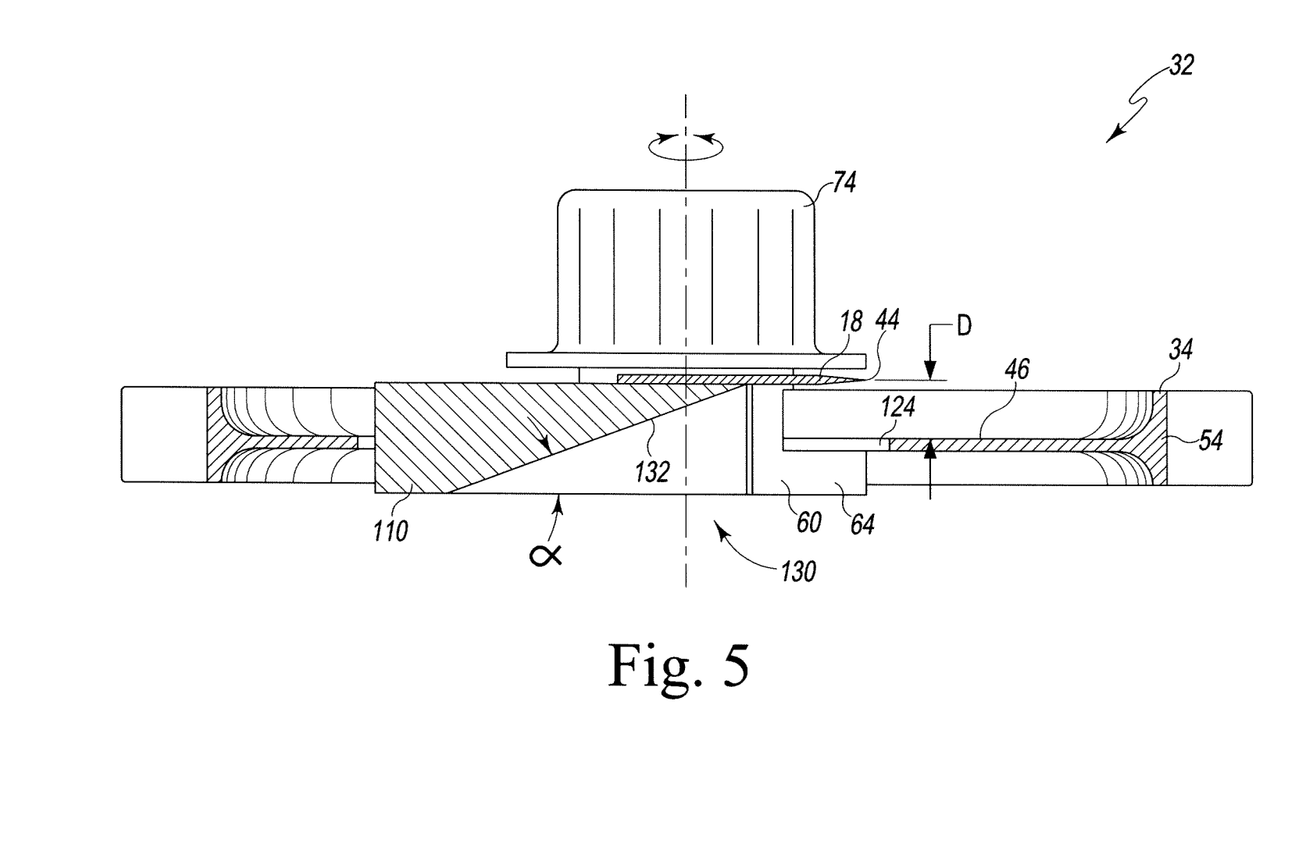
FIG. 5 is a partial cross sectional view of the food slicer assembly of FIG. 4 taken along the line 5-5.

As shown in FIG. 4, the opening 69 formed in the planar body 52 extends radially outward and receives the mounting arm 110 and the cutting blade 18. When the food slicer assembly 32 is assembled, a gap or throat 124 is defined between the cutting edge 44 and the body 52, as best seen in FIGS. 4 and 5. The food slicer assembly 32 also includes a counterweight 126 coupled to the planar body 52 adjacent to the outer perimeter of the rotating disk 34. As shown in FIGS. 2 and 3, the hub 60 is positioned between the counterweight 126 and the cutting blade 18. The counterweight 126 is sized to offset the weight of the mounting arm 110 and the cutting blade 18. In that way, the counterweight 126 balances the slicer assembly 32 as it is rotated. In other embodiments, the separate counterweight 126 may be omitted and additional material may be added to the rim 54 and the planar body 52 such that the counterweight is incorporated into the rotating disk 34.

During operation, the user may change the cutting position of the rotating disk 34 using the control knob 74. When the control knob 74 is rotated, the hub 60 translates upwardly and downwardly along the central shaft 98 to change the thickness of the food items being processed by the food processor 10. In particular, counter-clockwise rotation of the control knob 74 causes downward movement of the hub 60 (and hence rotating disk 34), which increases the distance D between the cutting edge 44 of the cutting blade 18 and the upper surface 46 of the rotating disk 34 and thereby produces thicker pieces of food items. Oppositely, when the control knob 74 is rotated clockwise, the hub 60 is moved upwardly along the central shaft 98 and the distance D between the cutting edge 44 of the cutting blade 18 and the upper surface 46 of the rotating disk 34 is decreased, thereby producing thinner pieces of food items.

When the food processor 10 is activated, the motor 14 causes the blade assembly 38 to rotate. The blade assembly 38 acts on the hub 60 secured to the rotating disk 34 such that the rotating disk 34 and the blade assembly 38 rotate together. Food items inserted through the feed tube 28 are urged into contact with the upper surface 46 of the rotating disk 34 while being acted upon (i.e., cut) by the cutting blade 18. Cut food items, along with other food items small enough to fit within the throat 124, pass from the upper compartment 40 through the throat 124.

A ramp 130 defined in the mounting arm 110 guides food items from the upper compartment 40 to the lower compartment 42. As shown in FIG. 5, the ramp 130 is positioned adjacent to and below the cutting blade 18 and includes an inclined surface 132 extending downwardly from the underside of cutting blade 18. The inclined surface 132 extends from the inner end 112 of the mounting arm 110 radially outward to the outer end 114 of the mounting arm 110. As shown in FIGS. 2 and 3, the inner end 112 defines an inner sidewall 134 for the ramp 130, while the outer end 114 of the mounting arm 110 defines an outer sidewall 136. In that way, the inclined surface 132 is encapsulated or captured between the sidewalls 134, 136, thereby reducing the potential for food items to travel outside of the processing path and thus reducing unwanted debris.

Figure 6:
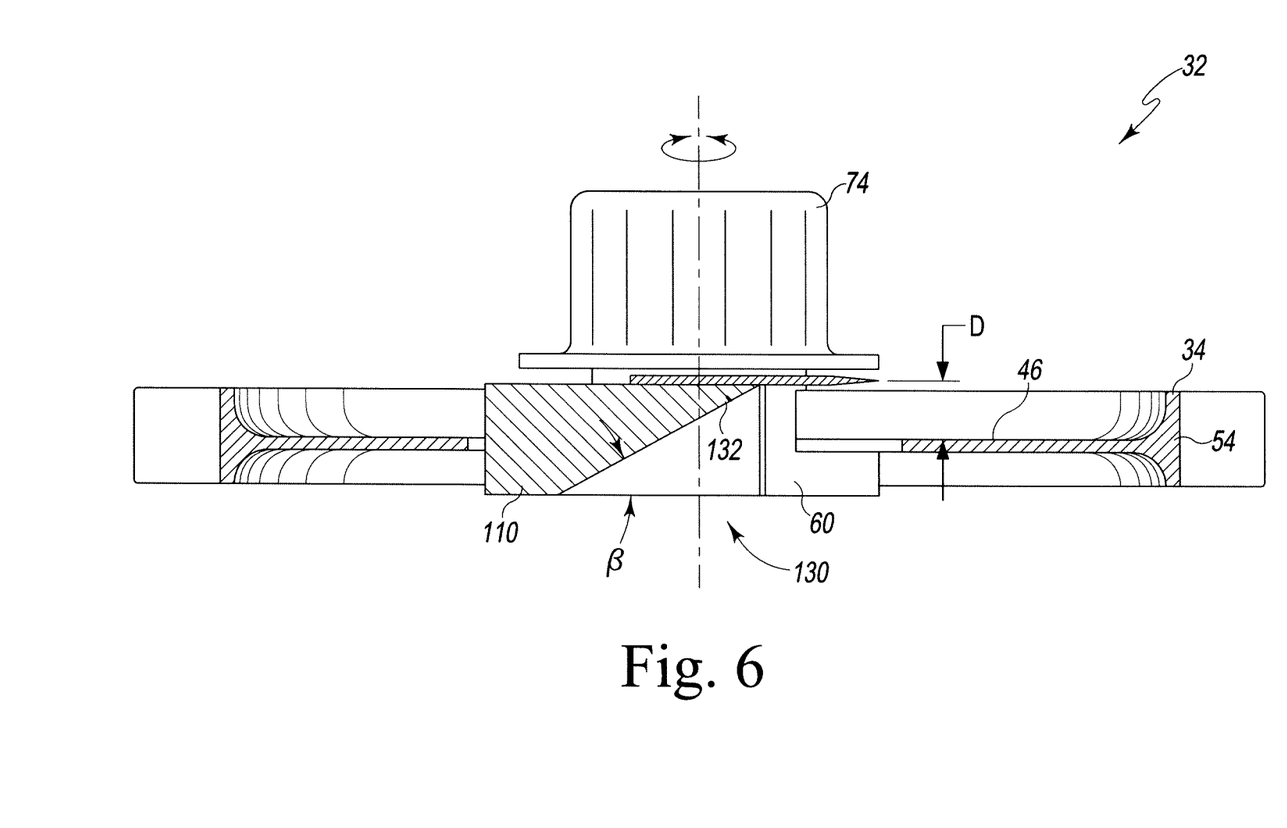
FIG. 6 is a partial cross sectional view of the food slicer assembly of FIG. 4 taken along the line 6-6 showing the angle of inclination of the ramp.

As shown in FIGS. 5 and 6, the slope or angle of the inclined surface 132 relative to the cutting blade 18 changes as the inclined surface 132 extends radially outward. As shown in FIG. 5, which is a cross-section of the slicer assembly 32 taken at the outer end 114 of the mounting arm 110, the inclined surface 132 has an angle of inclination $\alpha$ at the outer end 114. As shown in FIG. 6, which is a cross-section of the slicer assembly 32 taken at the inner end 112 of the mounting arm 110, the inclined surface 132 has an angle of inclination $\beta$ that is greater than the angle $\alpha$. In the illustrative embodiment, the angle $\alpha$ is approximately 15 degrees, and the angle $\beta$ is approximately 25 degrees. It will be appreciated that in other embodiments the angles $\alpha$, $\beta$ may be greater than or less than those of the illustrative embodiment. Additionally, in some embodiments, the angles $\alpha$, $\beta$ may be equal. In still other embodiments, the inclined surface 132 may be convex or concave in one or more directions.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

For example, while food processing device 10 is herein illustrated as a conventional domestic food processor, the features and aspects disclosed herein can also be implemented in other types of food processing devices such as automatic food slicers, dicers, ice shavers and the like. Similarly, in other embodiments, the rotating disk could be directly coupled to motor, and the blade could be moveable relative to the rotating disk.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A food processing device comprising:
    a base having a motor positioned therein,
    a removable bowl coupled to the base,
    a removable lid coupled to the bowl so as to define a processing chamber, the lid having a feed tube that opens into the bowl,
    a blade assembly positioned in the processing chamber and driven by the motor, the blade assembly including a cutting blade to cut food items advanced through the feed tube,
    a rotating disk including an upper surface, the rotating disk being upwardly and downwardly moveable relative to the cutting blade to adjust the distance between the upper surface of the rotating disk and the cutting blade, and
    an adjustment assembly operable to move the rotating disk relative to the cutting blade, wherein the adjustment assembly includes (i) a control knob coupled to the blade assembly and positioned above the upper surface of the rotating disk and (ii) a threaded sleeve coupled to the rotating disk and positioned in the control knob,
    wherein the rotating disk divides the processing chamber into an upper compartment and a lower compartment, and the blade assembly includes a mounting arm having a ramp defined therein to guide food items from the upper compartment to the lower compartment.

2. The food processing device of claim 1, wherein the ramp has an inclined surface extending outwardly in a radial direction from a first end to a second end, the inclined surface having a first angle of inclination at the first end that is greater than or equal to a second angle of inclination at the second end.

3. The food processing device of claim 2, wherein the first angle of inclination is approximately 25 degrees.

4. The food processing device of claim 3, wherein the second angle of inclination is approximately 15 degrees.

5. The food processing device of claim 1, wherein the rotating disk has a counterweight secured thereto, and the threaded sleeve is positioned between the mounting arm and the counterweight.

6. The food processing device of claim 1, wherein:
    rotation of the control knob in a first direction causes upward movement of the rotating disk, and
    rotation of the control knob in a second direction causes downward movement of the rotating disk.

7. The food processing device of claim 1, wherein:
    the blade assembly includes a central shaft coupled to the control knob, the central shaft being received in the threaded sleeve, and
    rotation of the control knob causes the threaded sleeve to move upwardly and downwardly along the central shaft.

8. A food slicer assembly for a food processor, comprising:
    a cutting blade,
    a mounting arm positioned below the cutting blade, the mounting arm having a ramp defined therein,
    a rotating disk including an upper surface, the rotating disk being moveable to a plurality of positions relative to the cutting blade to adjust the distance between the upper surface and the cutting blade, and
    an adjustment assembly operable to move the rotating disk relative to the cutting blade, wherein the adjustment assembly includes (i) an internally-threaded control knob positioned above the upper surface of the rotating disk, and (ii) an externally-threaded sleeve coupled to the rotating disk and positioned in the control knob.

9. The food slicer assembly of claim 8, wherein:
    rotation of the control knob in a first direction causes upward movement of the rotating disk, and
    rotation of the control knob in a second direction causes downward movement of the rotating disk.

10. The food slicer assembly of claim 8, further comprising:
    a central shaft coupled at an upper end to the control knob and positioned in the sleeve,
    wherein the mounting arm extends outwardly from a first end secured to the central shaft to a second end positioned adjacent to an outer rim of the rotating disk.

11. The food slicer assembly of claim 10, wherein the ramp has an inclined surface extending in a radial direction from the first end of the mounting arm to the second end of the mounting arm, the inclined surface having a first angle of inclination at the first end that is greater than or equal to a second angle of inclination at the second end.

12. The food slicer assembly of claim 11, wherein the first angle of inclination is approximately 25 degrees.

13. The food slicer assembly of claim 8, wherein the rotating disk includes a counterweight, and the sleeve is positioned between the counterweight and the mounting arm.

14. A food processor comprising:
    a base having a motor positioned therein,
    a removable bowl coupled to the base,
    a removable lid coupled to the bowl so as to define a processing chamber, the lid having a feed tube that opens into the bowl,
    a cutting blade positioned in the bowl and driven by the motor to cut food items advanced through the feed tube,
    a rotating disk upwardly and downwardly moveable relative to the cutting blade to adjust the distance therebetween, the rotating disk dividing the processing chamber into an upper compartment and a lower compartment,
    a ramp positioned below the cutting blade to guide food items from the upper compartment into the lower compartment, and
    an adjustment assembly operable to move the rotating disk relative to the cutting blade, the adjustment assembly including a user-operated control device positioned above the rotating disk.

15. The food processor of claim 14, wherein the adjustment assembly includes an externally-threaded sleeve coupled to the rotating disk, the user-operated control device includes an internally-threaded control knob having a grip, and the sleeve is positioned in the control knob.

16. The food processor of claim 15, wherein:
    rotation of the control knob in a first direction causes upward movement of the rotating disk, and
    rotation of the control knob in a second direction causes downward movement of the rotating disk.

17. The food processor of claim 14, wherein the ramp includes an inclined surface, the inclined surface extending outwardly in a radial direction from a first end to a second end and having a first angle of inclination at the first end that is greater than or equal to a second angle of inclination at the second end.

* * * * *